Patented Jan. 1, 1924.

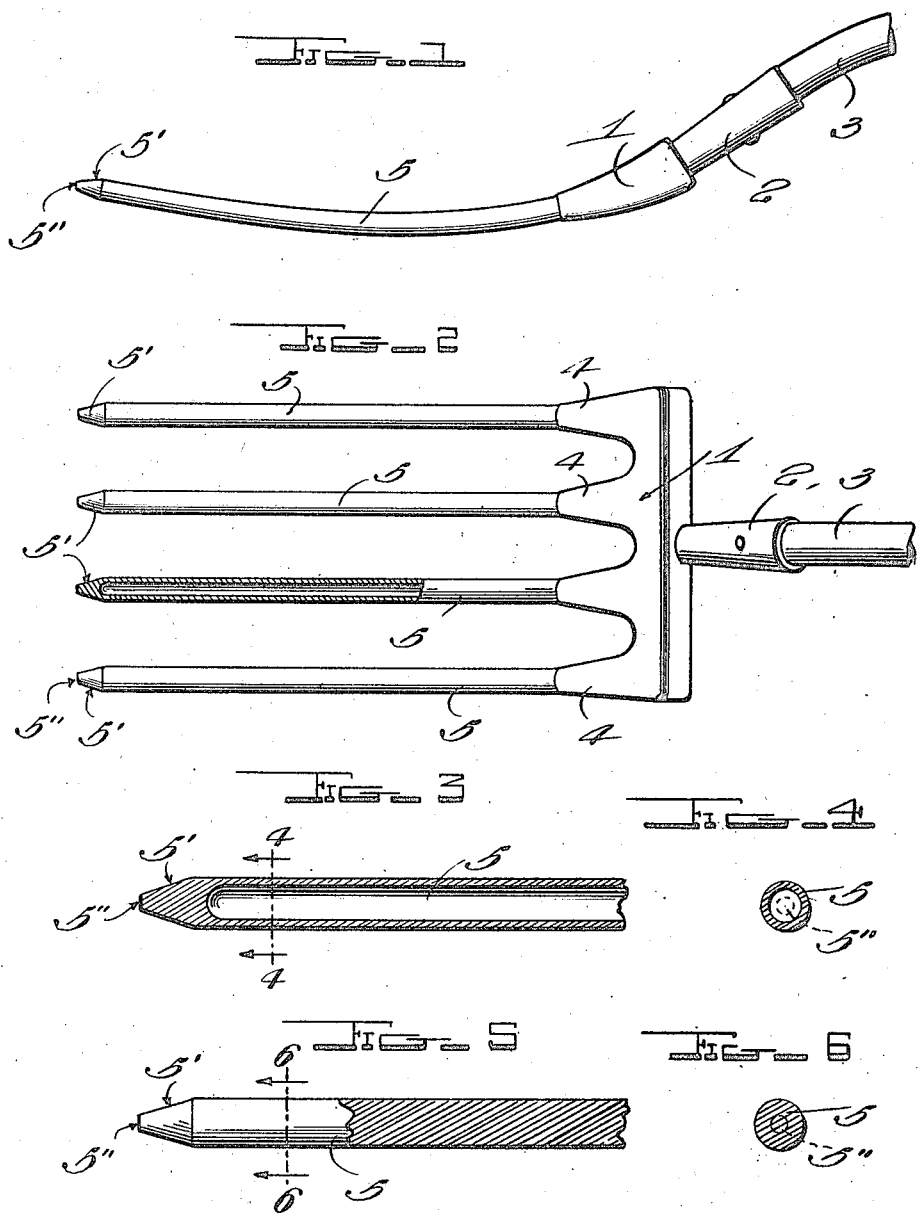

1,479,054

UNITED STATES PATENT OFFICE.

JOSEPH FRANK CHLADEK, OF NIOBRARA, NEBRASKA.

PITCHFORK.

Application filed June 19, 1922. Serial No. 569,352.

*To all whom it may concern:*

Be it known that I, JOSEPH F. CHLADEK, a citizen of the United States, residing at Niobrara, in the county of Knox and State of Nebraska, have invented certain new and useful Improvements in Pitchforks, of which the following is a specification, reference being had therein to the accompanying drawing.

This invention relates to an improved pitch fork for use in handling bundles of corn stalks and other similar heavy fodder and one object of the invention is to so construct the teeth of the pitch fork that when thrust into a bundle of corn stalk fodder the teeth will not penetrate the corn stalks, but will pass between the stalks and thus permit the bundles of fodder to be readily handled and prevent the bundles from sticking to the teeth of the fork. When forks with sharpened teeth are used, they have a tendency to penetrate the stalks of fodder and the bundles will then stick to the fork and cannot be readily shaken loose. In most cases, the bundles have to be removed by hand and this is very annoying and further causes a great waste of time. The tines or teeth of the improved fork disclosed in the accompanying drawing are relatively thick and are provided with points which are blunt enough to prevent them from penetrating the stalks, but at the same time tapered so that they can readily pass betwen the stalks.

This improved fork is illustrated in the accompanying drawing:

Fig. 1 is a view showing the improved fork in side elevation.

Fig. 2 is a top plan view of the fork.

Fig. 3 is a longitudinal sectional view through one of the teeth or tines of the fork, and discloses a tooth of a hollow construction.

Fig. 4 is a transverse sectional view taken along the line 4—4 of Fig. 3.

Fig. 5 is a view showing a tooth partially in side elevation and partially in longitudinal section and disclosing a tooth of a solid construction.

Fig. 6 is a transverse sectional view taken along the line 6—6 of Fig. 5.

This improved fodder handling fork is provided with a head 1 having a socket 2 extending therefrom to carry the handle 3 which may be of any desired length. Arms 4 extend in spaced relation and while the present disclosure shows four of these arms, each of which carries a tooth or tine 5, it will be understood that any desired number of teeth may be provided, the head of course being provided with an arm 4 for each of the teeth. It will also be obvious that since the improvement resides in the teeth, any suitable type of head may be provided for carrying these teeth. These teeth 5 are anchored to the arms 4 in any suitable manner and these teeth will be relatively very thick teeth instead of the usual diameter provided for pitch fork teeth. The teeth may be hollow as shown in Figs. 2, 3 and 4 so that they will be relatively light or if so desired, they may be solid as shown in Figs. 5 and 6, in which case, they will be formed of any suitable material and preferably of some relatively light material, which will prevent them from adding too much weight to the fork. Each of the teeth has its free end portion 5' tapered as shown and terminating in a flat end 5''. Therefore, the teeth will have their free end portions tapered so that the teeth can readily pass between the fodder stalks and permit the bundle of fodder to be easily lifted by means of the fork but at the same time, but they will have blunt ends which will prevent the teeth from penetrating the stalks. A fork will thus be provided which can be used to handle corn stalks, fodder or any other type of heavy fodder which it is desired to permit of being picked up by the fork without the teeth of the fork penetrating the stalks and causing the fodder to stick to the fork.

I claim:

1. A pitch fork having a head, and teeth extending from said head, each of said teeth being in the form of a tube of substantially an even diameter throughout practically its entire length, the free end portion of the tooth being formed into a solid end portion tapered and terminating in a blunt point.

2. A pitch fork comprising a head, and teeth extending from said head, said teeth being circular in cross section and each of substantially an even diameter throughout practically its entire length, said teeth having their free end portions solid and tapered and terminating in straight-cut ends forming blunt points.

In testimony whereof I hereunto affix my signature.

JOSEPH FRANK CHLADEK.